No. 639,509. Patented Dec. 19, 1899.
J. W. BONTA.
APPARATUS FOR MANUFACTURING GLASS PIPE.
(Application filed Nov. 11, 1897. Renewed Oct. 21, 1899.)
(No Model.) 2 Sheets—Sheet 1.
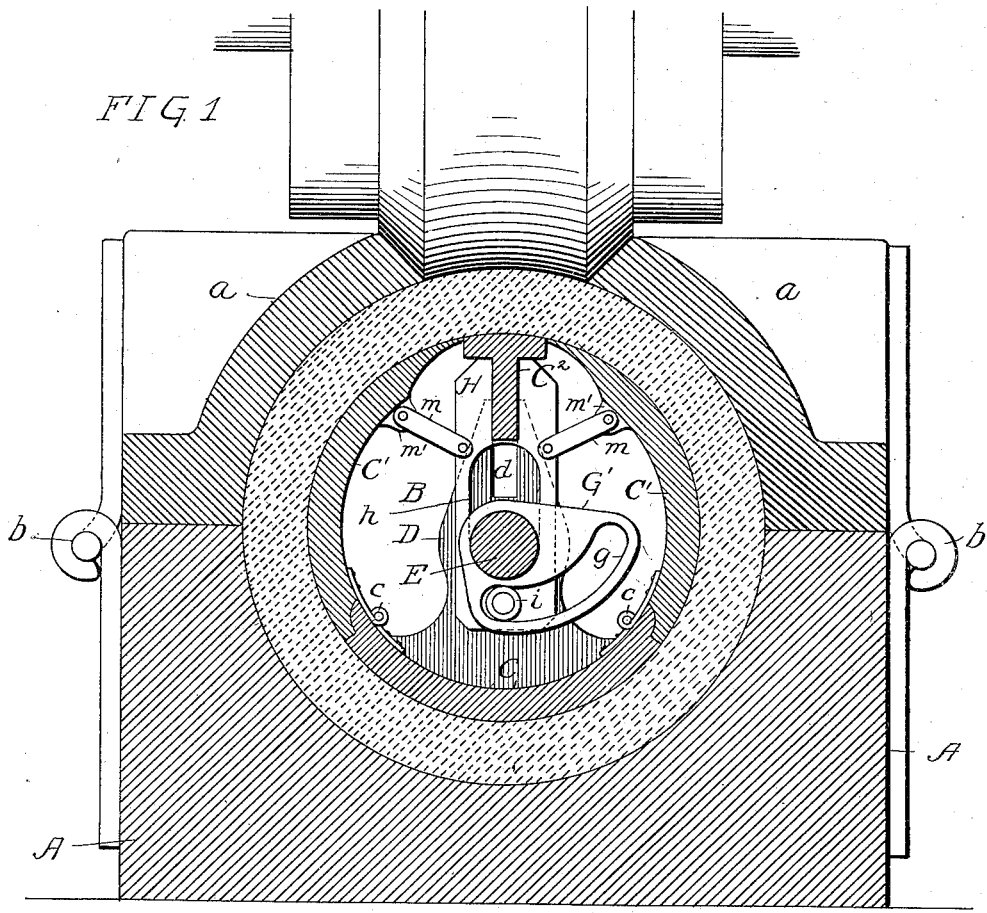

No. 639,509. Patented Dec. 19, 1899.
J. W. BONTA.
APPARATUS FOR MANUFACTURING GLASS PIPE.
(Application filed Nov. 11, 1897. Renewed Oct. 21, 1899.)
(No Model.) 2 Sheets—Sheet 2.
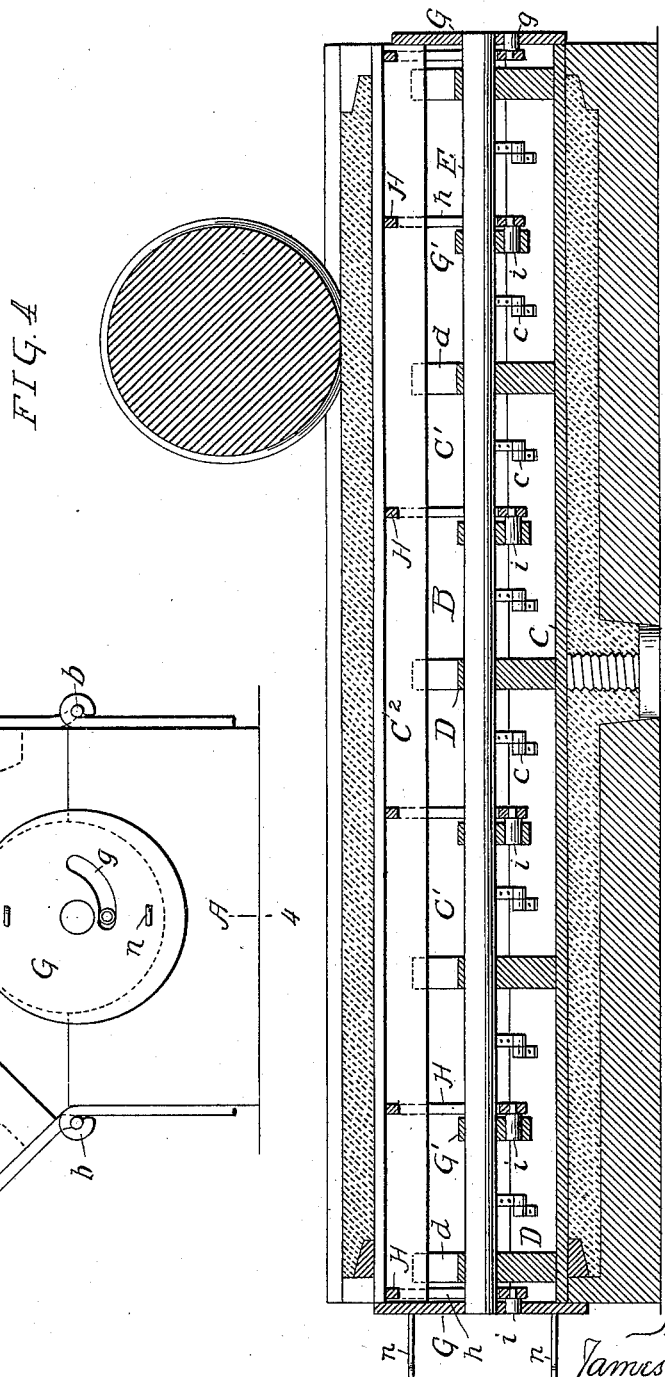
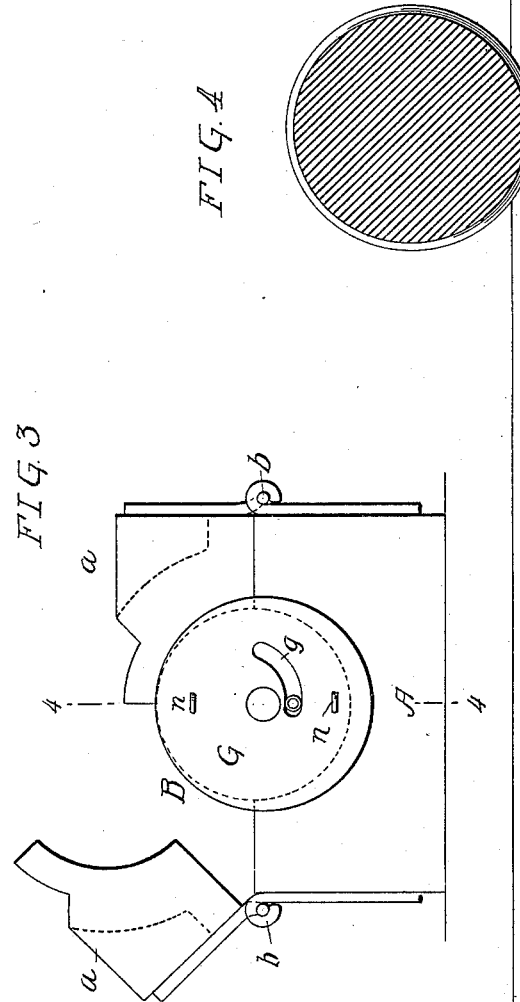

UNITED STATES PATENT OFFICE.

JAMES W. BONTA, OF WAYNE, PENNSYLVANIA, ASSIGNOR TO THE BONTA GLASS PIPE AND CONDUIT COMPANY, OF SCRANTON, PENNSYLVANIA.

APPARATUS FOR MANUFACTURING GLASS PIPE.

SPECIFICATION forming part of Letters Patent No. 639,509, dated December 19, 1899.

Application filed November 11, 1897. Renewed October 21, 1899. Serial No. 734,404. (No model.)

*To all whom it may concern:*

Be it known that I, JAMES W. BONTA, a citizen of the United States, and a resident of Wayne, Delaware county, State of Pennsylvania, have invented certain new and useful Apparatus for Manufacturing Glass Pipe, of which the following is a full, clear, and exact description, reference being had to the accompanying drawings, forming part of this specification.

My invention relates to certain improvements in apparatus for manufacturing pipe, and has for its principal object to provide an improved form of contractile core, more especially adapted for use in the manufacture of glass pipe, as more fully set forth hereinafter.

In the accompanying drawings, Figure 1 is a transverse sectional elevation of an apparatus for manufacturing glass pipe illustrating a contractile core constructed in accordance with my invention. Fig. 2 is a similar view of the core proper in a contracted position. Fig. 3 is an elevation of one end of the core; and Fig. 4 is a longitudinal sectional elevation of the core on the line 4 4, Fig. 3.

Referring to the drawings, A represents the bottom section of a mold formed of iron or other suitable material, and to this bottom section are hinged top or side sections $a$, the point of connection or contact between the hinged sections being on the horizontal diameter of the mold, so that when the top sections are thrown back or removed the pipe may be readily removed and transferred to the annealing-oven. The top sections $a$ are separated at the upper central portions of the mold by a space sufficient to permit the pouring of the glass, and the hinges $b$, which serve to connect the sections, are of the ordinary pin-and-socket construction, so that when occasion requires the sections may by readily separated from each other.

The inner diameter of the pipe manufactured is governed by a contractile core B, comprising a base-section C, side wings C', hinged thereto, and a radially-movable filling-bar $C^2$.

On the base-section C are a number of blocks D, adapted for the support and guidance of a shaft E, to which are secured end plates G, having cam-slots $g$, and at intervals throughout the length of the shaft are secured blocks G', having similarly-slotted cams $g$. The filling-bar $C^2$ is of T shape in cross-section, and its central depending web or flange $c^2$ is adapted to slotted guideways $d$, formed in the upper portions of the blocks D, so that the bar in its movement toward and from the center of the core will be guided in a radial line. To the web or flange $c^2$ of the filling-bar are secured at intervals a number of plates H, slotted at $h$, so that they may pass around the shaft E, the slot being of a width somewhat greater than the diameter of the shaft, so that said shaft will act as a guide to retain the plates in proper position. Each plate H carries a stud or antifriction-roller $i$, adapted to one of the cam-slots $g$, the arrangement and operation being such that on the turning of the shaft the cams, through the antifriction-rollers $i$ and plates H, will act to move the filling-bar toward and from the center of the core.

The side sections or wings C' are hinged at $c$ to the edges of the base-sections C, and in order to prevent the entrance of any material to the interior of the core the point of contact between the base-sections and the hinge-sections is concentric to the center of the hinge-pivot. The opposite ends of the hinged sections C' are cut away at $l$ to form a comparatively sharp edge, so that after the filling-bar commences its inward movement in the contraction of the core the hinged sections will be free to move from the position shown in Fig. 1 to that illustrated in Fig. 2, the necessary inward movement of the hinged sections being given by the downward movement of the plates H, which are connected by links $m$ to lugs $m'$ on the inner surfaces of said hinged sections.

In the manufacture of a pipe-section the mold and core, having been previously heated to a degree sufficient to prevent the checking of the glass, are placed in position with the core fully expanded, and molten glass is gradually poured into the mold through the space between the sections $a$ until a sufficient quantity of glass has been introduced to form the pipe-sections. The contact of the glass with the metal of the mold and core will almost immediately reduce the temperature of the glass, and the resultant contraction would destroy the pipe if the core were to remain for any length of time in its fully-expanded position. To permit the gradual contraction of the glass and at the same time to afford a support for the mass of glass before it has set and while in a semiplastic condition, the core is contracted by turning of the shaft E and causing the cams $g$ to act upon the filling-bar and the hinged sections of the core. The turning of the shaft is readily effected by means of small rods $n$, projecting from one of the end plates G, and these may also be employed in the removal of the core after the pipe has set sufficiently to permit of its removal to the annealing-oven.

Having thus described my invention, what I claim, and desire to secure by Letters Patent, is—

1. The combination in a contractile core, of the base-section, guiding-blocks thereon, a shaft adapted to bearings in said blocks, a radially-movable filling-bar guided in said blocks, side sections hinged to the base-section, operating-cams carried by the shaft, and connected to the filling-bar, and means for mechanically connecting the hinged side sections to said cams, substantially as specified.

2. The combination in a contractile core, of the base-section, guiding-blocks thereon, a shaft adapted to bearings in said blocks, operating-cams on said shaft, a radially-movable filling-bar guided by said blocks, radially-movable plates connecting the filling-bar and cams, side sections hinged to the base-section, and links connecting said side sections to said radially-removable plates, substantially as specified.

3. The combination in a contractile core, of the base-section, C, having guiding-blocks, D, side sections, C', hinged at the opposite edges of the base-section, a webbed filling-bar guided radially in said blocks, D, a shaft, E, supported by the blocks, D, slotted cams carried by said shaft, slotted plates, H, connected to the webbed filling-bar and guided at their lower ends by said shaft, studs, $i$, carried by the plates and adapted to the cam-slots, and links, $m$, connecting the hinged sections to said plates, H, substantially as specified.

In witness whereof I have hereunto set my hand this 11th day of October, A. D. 1897.

JAMES W. BONTA.

Witnesses:
EDMUND S. MILLS,
JNO. E. PARKER.